United States Patent
Choi

(10) Patent No.: US 10,252,718 B2
(45) Date of Patent: Apr. 9, 2019

(54) METHOD AND APPARATUS FOR CONTROLLING OPERATION OF HYDRAULIC IDLE STOP AND GO (ISG) SYSTEM USING ELECTRO HYDRAULIC POWER STEERING (EHPS) SYSTEM

(71) Applicant: HYUNDAI MOTOR COMPANY, Seoul (KR)

(72) Inventor: Young-Seol Choi, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 101 days.

(21) Appl. No.: 15/262,122

(22) Filed: Sep. 12, 2016

(65) Prior Publication Data

US 2017/0106868 A1    Apr. 20, 2017

(30) Foreign Application Priority Data

Oct. 15, 2015  (KR) .................. 10-2015-0144063

(51) Int. Cl.
*B60W 30/18* (2012.01)
*F15B 1/02* (2006.01)
(Continued)

(52) U.S. Cl.
CPC ....... *B60W 30/18018* (2013.01); *B62D 5/065* (2013.01); *F02N 7/00* (2013.01);
(Continued)

(58) Field of Classification Search
CPC ....... B60W 30/18018; B60W 2510/30; B60W 2510/20; B60W 2510/202;
(Continued)

(56) References Cited

U.S. PATENT DOCUMENTS 4,699,021 A * 10/1987 Waddington ........... B62D 11/10
180/6.44
5,113,158 A *  5/1992 Tsuji ..................... H03K 7/08
318/599

(Continued)

FOREIGN PATENT DOCUMENTS

JP    2007-224737 A    9/2007
JP    2011-202616 A    10/2011
(Continued)

*Primary Examiner* — Richard A Goldman
(74) *Attorney, Agent, or Firm* — Morgan Lewis & Bockius LLP

(57) ABSTRACT

A method for controlling operation of a hydraulic idle stop and go (ISG) system using an electro hydraulic power steering (EHPS) system includes measuring a pressure in an accumulator, a steering angle, and a steering angular velocity; determining whether the measured pressure in the accumulator is less than an absolute value of a first reference pressure; determining whether the measured steering angle is less than an absolute value of a reference angle when the measured pressure in the accumulator is less than the absolute value of the first reference pressure; determining whether the measured steering angular velocity is less than an absolute value of a reference angular velocity when the measured steering angle is less than the absolute value of the reference angle; and opening a solenoid valve when the measured steering angular velocity is less than the absolute value of the reference angular velocity.

11 Claims, 3 Drawing Sheets

(51) Int. Cl.
  *F15B 1/027* (2006.01)
  *B62D 5/065* (2006.01)
  *F02N 7/00* (2006.01)

(52) U.S. Cl.
  CPC .............. *F15B 1/024* (2013.01); *F15B 1/027* (2013.01); *B60W 2510/20* (2013.01); *B60W 2510/30* (2013.01); *B60W 2600/00* (2013.01)

(58) Field of Classification Search
  CPC ..... B60W 2510/205; B60W 2510/207; B60W 2600/00; B62D 5/065; B62D 5/07; B62D 5/075; F02N 7/00; F15B 1/024; F15B 1/027; Y02T 10/6208; B60K 6/12
  USPC ............. 701/70, 112, 113, 90; 180/442, 441
  See application file for complete search history.

(56) References Cited

U.S. PATENT DOCUMENTS

| | | | | |
|---|---|---|---|---|
| 5,640,324 | A * | 6/1997 | Inagaki | B60T 8/172 180/197 |
| 6,275,759 | B1 * | 8/2001 | Nakajima | B60K 6/543 123/179.4 |
| 6,345,682 | B1 * | 2/2002 | Schoffler | B62D 5/061 180/415 |
| 8,577,582 | B2 * | 11/2013 | Yu | F02D 28/00 123/179.4 |
| 8,766,787 | B2 * | 7/2014 | Yu | B60W 50/14 123/179.3 |
| 9,020,678 | B2 * | 4/2015 | Nakajima | B60W 30/18027 180/65.285 |
| 9,103,312 | B2 * | 8/2015 | Moriya | B60K 28/12 |
| 9,284,910 | B2 * | 3/2016 | Tatewaki | F02D 45/00 |
| 9,790,910 | B2 * | 10/2017 | Quinteros | F02N 11/084 |
| 9,945,341 | B2 * | 4/2018 | Kato | B60T 8/885 |
| 2001/0025489 | A1 * | 10/2001 | Bockling | B60T 11/10 60/533 |
| 2001/0056544 | A1 * | 12/2001 | Walker | B60R 25/02 726/2 |
| 2003/0141138 | A1 * | 7/2003 | Shimizu | B62D 5/065 180/422 |
| 2003/0141139 | A1 * | 7/2003 | Shimizu | B62D 5/065 180/422 |
| 2004/0157700 | A1 * | 8/2004 | Katou | B60W 30/18054 477/45 |
| 2004/0262995 | A1 * | 12/2004 | Hawkins | F02N 11/0803 307/10.6 |
| 2005/0183916 | A1 * | 8/2005 | Katou | F16H 61/0204 192/3.29 |
| 2006/0000209 | A1 * | 1/2006 | Tsuda | B62D 5/065 60/422 |
| 2006/0169564 | A1 * | 8/2006 | Krisher | B60K 17/3462 192/85.53 |
| 2009/0120085 | A1 * | 5/2009 | Yamaura | B62D 5/062 60/423 |
| 2011/0306463 | A1 * | 12/2011 | Tamba | B60K 6/105 477/5 |
| 2012/0138006 | A1 * | 6/2012 | Gwon | F02N 11/0818 123/179.4 |
| 2016/0200349 | A1 * | 7/2016 | Whitaker, Jr. | B62D 5/062 180/421 |
| 2017/0001663 | A1 * | 1/2017 | Moberg | B62D 6/04 |
| 2017/0106868 | A1 * | 4/2017 | Choi | B60W 30/18018 |
| 2017/0113691 | A1 * | 4/2017 | Meehan | B60W 30/188 |
| 2017/0335867 | A1 * | 11/2017 | Meehan | B60K 6/12 |

FOREIGN PATENT DOCUMENTS

| | | |
|---|---|---|
| JP | 2013-091953 A | 5/2013 |
| JP | 2013-151257 A | 8/2013 |
| JP | 2013-189084 A | 9/2013 |
| JP | 2015-040485 A | 3/2015 |
| KR | 1988-0006262 U | 5/1988 |
| KR | 10-2013-0016877 A | 2/2013 |
| KR | 10-2013-0017226 A | 2/2013 |
| KR | 10-1491291 B1 | 2/2015 |

\* cited by examiner

METHOD AND APPARATUS FOR CONTROLLING OPERATION OF HYDRAULIC IDLE STOP AND GO (ISG) SYSTEM USING ELECTRO HYDRAULIC POWER STEERING (EHPS) SYSTEM

CROSS-REFERENCE TO RELATED APPLICATIONS

This application claims the benefit of priority to Korean Patent Application No. 10-2015-0144063, filed on Oct. 15, 2015, which is incorporated herein by reference in its entirety.

TECHNICAL FIELD

The present disclosure relates to a method and apparatus for controlling operation of a hydraulic idle stop and go (ISG) system using an electro hydraulic power steering (EHPS) system. More particularly, the present disclosure relates to a method and apparatus for controlling operation of a system having an integrated pump which performs the same function in an EHPS system and a hydraulic ISG system.

BACKGROUND

Eco-friendly vehicles have been actively developed due to the exhaustion of oil energy resources and reinforced environment regulations around the world. Thus, vehicle manufacturers have been focusing on development of core technology related thereto. Accordingly, researches for reducing fuel cost and exhaust gas through improvement in fuel efficiency have been consistently conducted, particularly in improving fuel efficiency in commercial vehicles with the high use rate of oil.

In general, an electro hydraulic power steering (EHPS) system and a hydraulic idle stop and go (ISG) system are used for the fuel efficiency improvement.

The EHPS system uses a hydraulic pump which is powered by 24 volt power, instead of using an engine mount type mechanical power steering pump which runs continuously. Accordingly, the EHPS system stops the pump in a case where steering is unnecessary and adjusts the operation of the pump depending on the situation, thereby reducing unnecessary power consumption and improving fuel efficiency.

The hydraulic ISG system includes a hydraulic motor, a hydraulic pump, valves, an accumulator, etc. The hydraulic ISG system is a system which stops an engine when a vehicle stops, e.g. due to traffic lights or while passengers get into and out of the vehicle, and starts the engine using hydraulic pressure accumulated in the accumulator when the vehicle starts. A commercial hybrid bus currently utilizes an ISG function using a drive motor. However, it takes a relatively long period of time to operate an engine when the bus starts again. On the other hand, the hydraulic ISG system is a system which resolves the problem of a commercial hybrid vehicle, and is applicable to general vehicles.

However, when the above two systems are mounted in the vehicle in order to improve fuel efficiency in the prior art, it is difficult to secure a mounting space because of a large number of parts.

SUMMARY

The present disclosure is directed to a method and apparatus for controlling operation of a system in which an electro hydraulic power steering (EHPS) system is combined with a hydraulic idle stop and go (ISG) system.

Other objects and advantages of the present disclosure can be understood by the following description, and become apparent with reference to the embodiments in the present disclosure. Further, it is obvious to those skilled in the art that the objects and advantages of the present disclosure can be realized by the means as claimed and combinations thereof.

In accordance with an embodiment in the present disclosure, a method for controlling operation of a hydraulic idle stop and go (ISG) system using an electro hydraulic power steering (EHPS) system includes measuring a pressure in an accumulator, a steering angle, and a steering angular velocity, determining whether the measured pressure in the accumulator is less than an absolute value of a first reference pressure, determining whether the measured steering angle is less than an absolute value of a reference angle when the measured pressure in the accumulator is less than the absolute value of the first reference pressure, determining whether the measured steering angular velocity is less than an absolute value of a reference angular velocity when the measured steering angle is less than the absolute value of the reference angle, and opening a solenoid valve when the measured steering angular velocity is less than the absolute value of the reference angular velocity.

The method may further include determining whether the measured pressure in the accumulator exceeds an absolute value of a second reference pressure after the step of opening the solenoid valve.

The method may further include closing the solenoid valve when the measured pressure in the accumulator exceeds the absolute value of the second reference pressure.

The method may further include operating the ISG system after the step of closing the solenoid valve.

The step of operating the ISG system may be performed when the measured pressure in the accumulator is equal to or greater than the absolute value of the first reference pressure.

The step of measuring the pressure may be executed again when the measured steering angle is equal to or greater than the absolute value of the reference angle.

The step of measuring pressure may be executed again when the measured steering angular velocity is equal to or greater than the absolute value of the reference angular velocity.

The reference angle may be 540°.

The reference angular velocity may be 180°/sec.

The first reference pressure may be equal to the second reference pressure.

The first reference pressure and the second reference pressure may be 100 bars.

In accordance with another embodiment in the present disclosure, an apparatus for controlling operation of a hydraulic ISG system using an EHPS system includes a working fluid storage, an integrated hydraulic pump for pressurizing a working fluid transferred from the working fluid storage, a steering gearbox for steering a vehicle using the working fluid pressurized by the integrated hydraulic pump, an accumulator branched between the integrated hydraulic pump and the steering gearbox to store the working fluid pressurized by the integrated hydraulic pump, a solenoid valve disposed in front of the accumulator to open or close a communication pipe branched between the integrated hydraulic pump and the steering gearbox, and an ISG engine starting system for starting an engine when the vehicle restarts after idling stop by applying the working fluid stored in the accumulator.

The apparatus may further include a sensor for measuring a pressure of the working fluid stored in the accumulator, a steering angle, and a steering angular velocity.

The apparatus may further include a controller for opening or closing the solenoid valve based on information of the sensor.

The sensor may include a pressure sensor for measuring the pressure of the working fluid stored in the accumulator, a steering angle sensor for measuring the steering angle, and a steering angular velocity sensor for measuring the steering angular velocity.

The apparatus may further include a T-connector for branching the communication pipe between the integrated hydraulic pump and the steering gearbox.

DETAILED DESCRIPTION

Figure 1A:
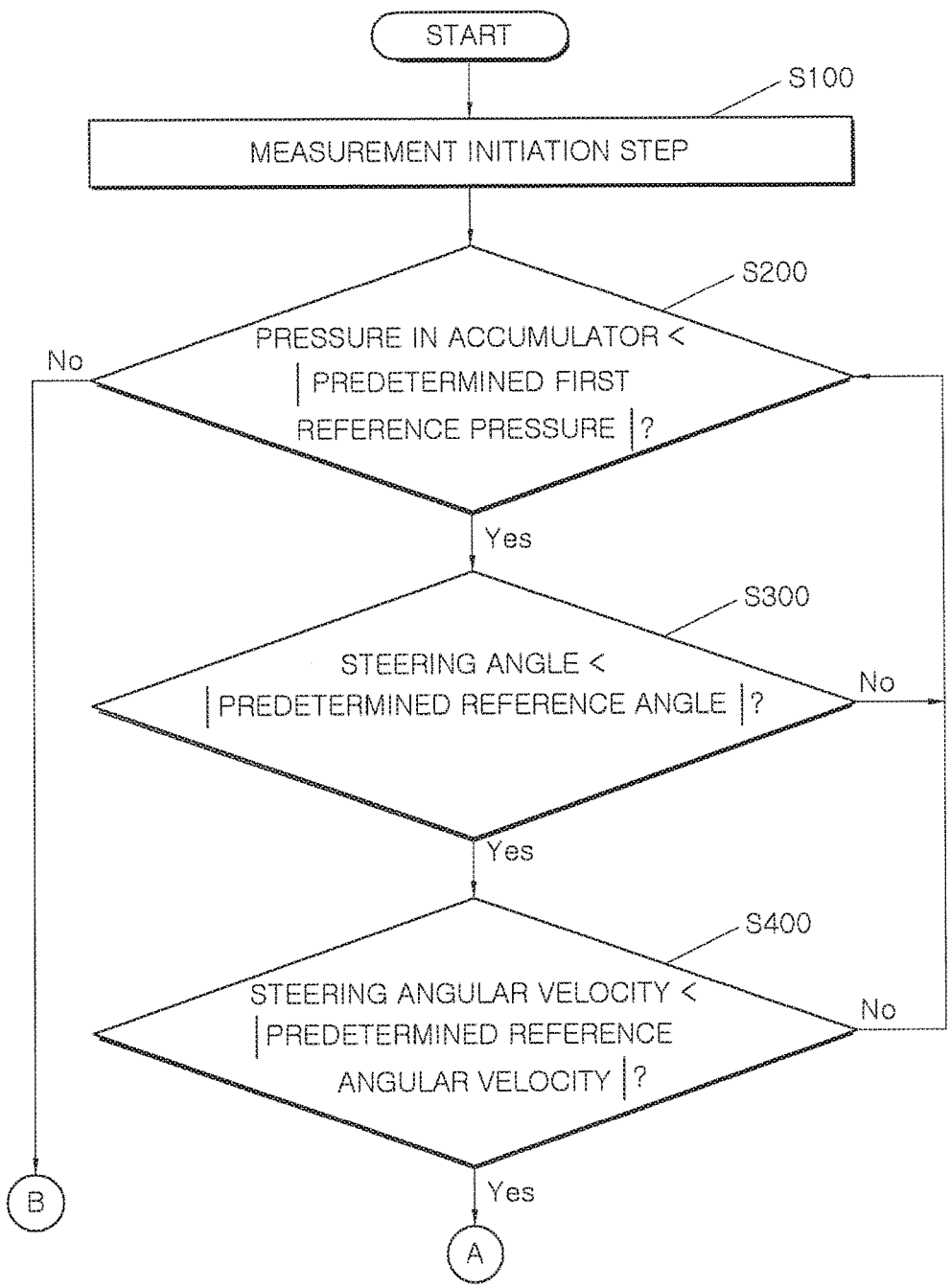
FIGS. 1A and 1B are flowcharts illustrating a method for controlling operation of a hydraulic ISG system using an EHPS system according to an embodiment in the present disclosure.

The terms and words used in the specification and claims should not be only relied on dictionary definitions. On the basis of the principle that the inventor can define the appropriate concept of a term in order to describe his/her own invention in the best way, it should be construed as meaning and concepts for complying with the technical idea of the present disclosure. Accordingly, the embodiments described in the present specification and the construction shown in the drawings are nothing but one exemplary embodiment, and it does not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of the present disclosure. Exemplary embodiments in the present disclosure will be described below in more detail with reference to the accompanying drawings.

Figure 1B:
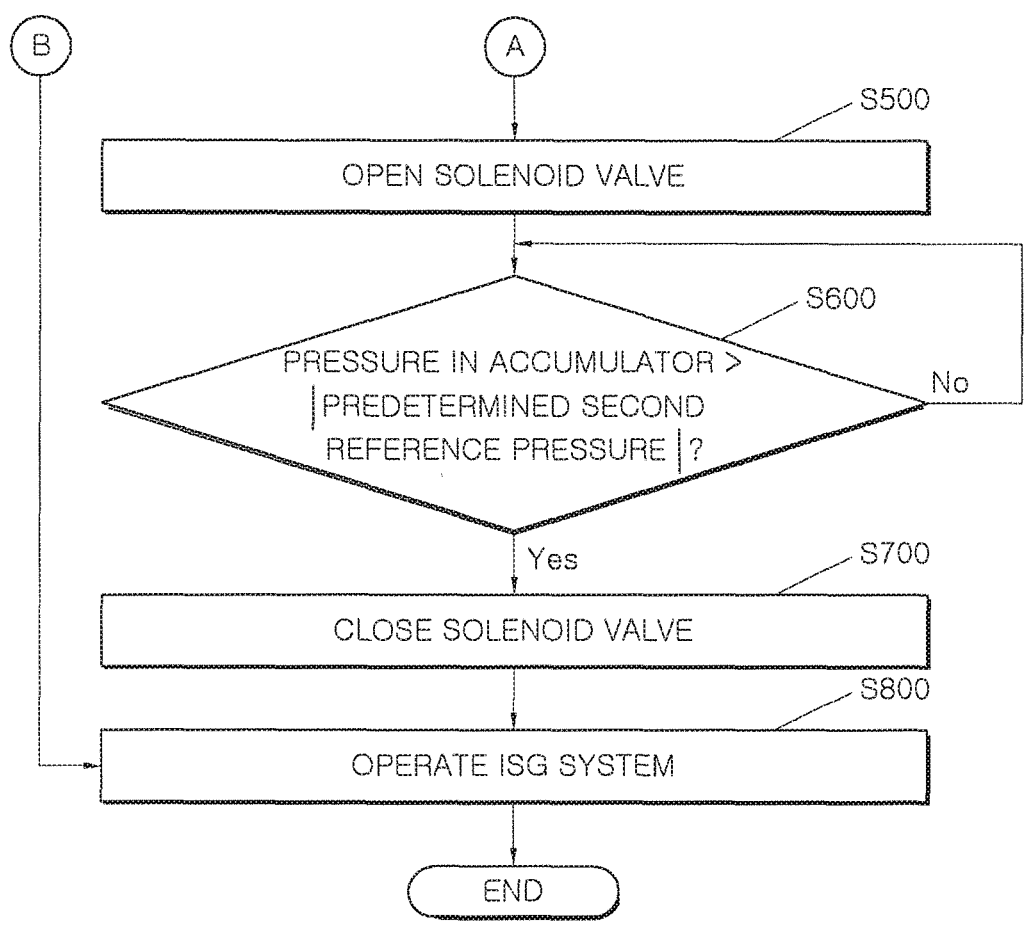

FIGS. 1A and 1B are flowcharts illustrating a method for controlling operation of a hydraulic idle stop and go (ISG) system using an electro hydraulic power steering (EHPS) system according to an embodiment in the present disclosure. Referring to FIGS. 1A and 1B, a method for controlling operation of a hydraulic ISG system using an EHPS system includes a step of initiating measurement of a pressure in an accumulator, a steering angle, and a steering angular velocity (S100), a first pressure determination step of determining whether the measured pressure in the accumulator is less than an absolute value of a first reference pressure (S200), a steering angle determination step of determining whether the measured steering angle is less than an absolute value of a reference angle (S300) when the measured pressure in the accumulator is less than the absolute value of the first reference pressure, a steering angular velocity determination step of determining whether the measured steering angular velocity is less than an absolute value of a reference angular velocity (S400) when the measured steering angle is less than the absolute value of the reference angle, and a step of opening a solenoid valve (S500) when the measured steering angular velocity is less than the absolute value of the reference angular velocity In addition, when the measured pressure in the accumulator is equal to or more than the absolute value of the first reference pressure in step S200, a step of operating an ISG system (S800) is performed.

When the EHPS system and the hydraulic ISG system are simultaneously operated by the pressure in the accumulator, the ISG system may be immediately operated regardless of the steering angle or the steering angular velocity. Therefore, the first pressure determination step (S200) is performed after the step of initiating measurement (S100). In addition, when the measured pressure in the accumulator is equal to or greater than the absolute value of the first reference pressure in step S200, the step of operating an ISG system (S800) is immediately performed. The first reference pressure is a pressure for allowing the EHPS system and the hydraulic ISG system to be simultaneously operated, and may be set to be different according to the type of vehicle.

When the measured pressure in the accumulator is less than the absolute value of the first reference pressure, the steering angle determination step (S300) and the steering angular velocity determination step (S400) are sequentially performed. That is, when the EHPS system and the hydraulic ISG system do not simultaneously operate by the pressure in the accumulator, it is determined whether the EHPS system requires hydraulic pressure according to the steering angle and the steering angular velocity. In this case, since the EHPS system for a steering function takes precedence over the ISG system for improvement in fuel efficiency, the ISG system does not operate when the EHPS system requires hydraulic pressure (when the measured steering angle is less than the absolute value of the reference angle, or when the measured steering angular velocity is less than the absolute value of the reference angular velocity). The reference angle and the reference angular velocity may be set to be different according to the type of vehicle. For example, the reference angle may be 540° and the reference angular velocity may be 180°/sec, but the present disclosure is not limited thereto. When the measured steering angle is determined to be equal to or more than the absolute value of the reference angle in step S300, the first pressure determination step (S200) is performed again. In addition, when the measured steering angular velocity is determined to be equal to or more than the absolute value of the reference angular velocity in step S400, the first pressure determination step (S200) is performed again. As described above, this enables the ISG system to be not operated when the EHPS system requires hydraulic pressure (when the measured steering angle is less than the absolute value of the reference angle, or when the measured steering angular velocity is less than the absolute value of the reference angular velocity). On the contrary, since the EHPS system does not require hydraulic pressure when the measured steering angle is less than the absolute value of the reference angle, and when the measured steering angular velocity is less than the absolute value of the reference angular velocity, the hydraulic ISG system may operate. Here, it is necessary to increase the pressure in the accumulator in order to simultaneously operate the EHPS system and the hydraulic ISG system. Thus, a working fluid pressurized by an integrated hydraulic pump 200 is supplied to an accumulator 400 in the step of opening a solenoid valve (S500).

In addition, the method for controlling operation of a hydraulic ISG system using an EHPS system includes a second pressure determination step of determining whether the measured pressure in the accumulator exceeds an absolute value of a second reference pressure (S600) after the step of opening a solenoid valve (S500). The second reference pressure is a pressure for allowing the EHPS system and the hydraulic ISG system to be simultaneously operated, and may be set to be different according to the type of vehicle. In addition, the first reference pressure may be equal to the second reference pressure. For example, the first reference pressure and the second reference pressure may be 100 bars, but the present disclosure is not limited thereto.

In addition, the method for controlling operation of a hydraulic ISG system using an EHPS system includes a step of closing the solenoid valve (S700) when the measured pressure in the accumulator exceeds the absolute value of the second reference pressure. In addition, the method for controlling operation of a hydraulic ISG system using an EHPS system includes a step of operating an ISG system (S800) after the step of closing the solenoid valve (S700). That is, when the measured pressure in the accumulator exceeds the absolute value of the second reference pressure after the solenoid valve is opened, the EHPS system and the hydraulic ISG system may be simultaneously operated. Therefore, there is no need to increase the pressure in the accumulator. Accordingly, the integrated hydraulic pump 200 is operated only for the EHPS system by closing the solenoid valve. Consequently, it is possible to improve the fuel efficiency by preventing the integrated hydraulic pump 200 from being unnecessarily operated.

Figure 2:
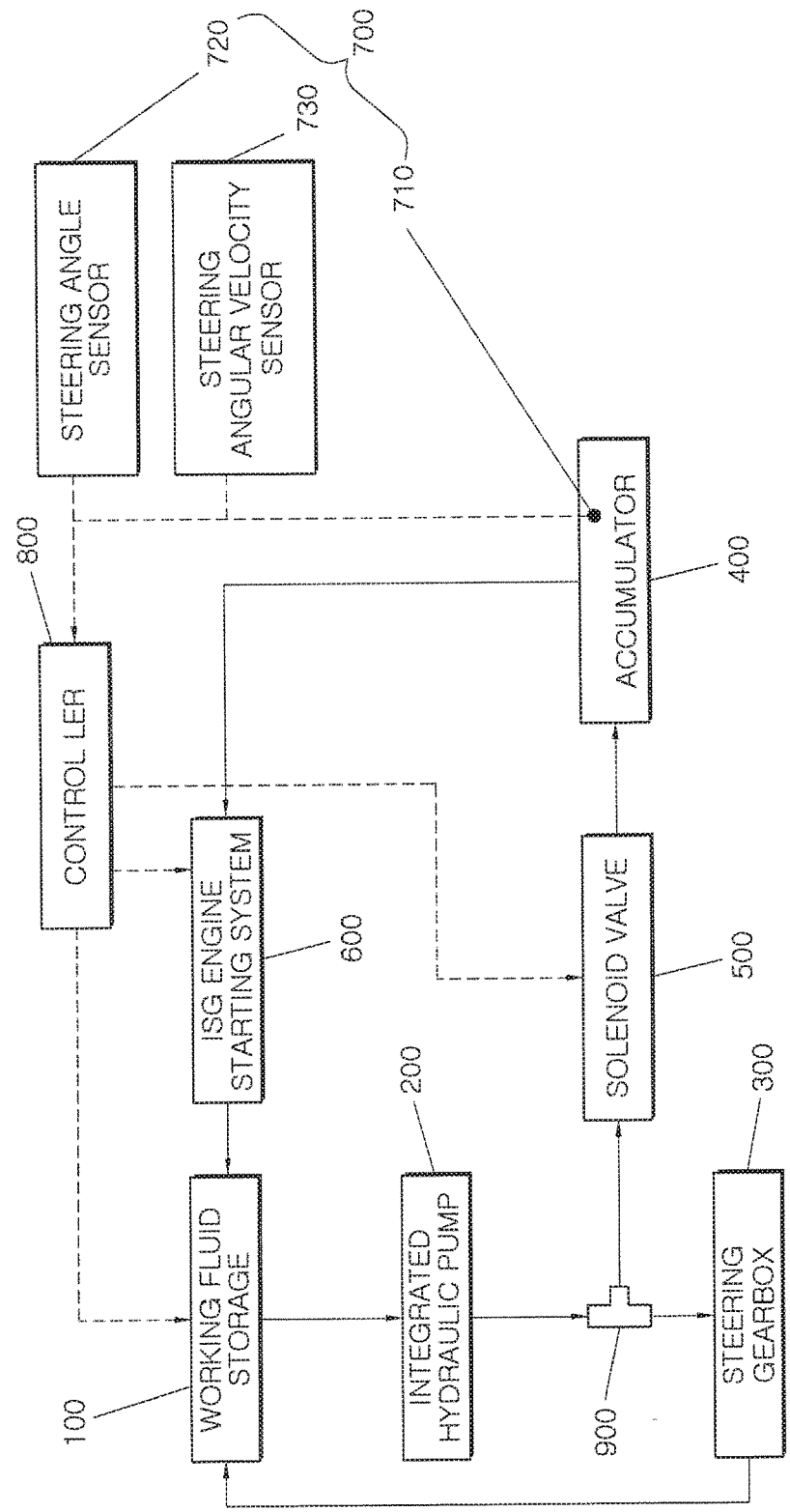
FIG. 2 is a block diagram illustrating an apparatus for controlling operation of a hydraulic ISG system using an EHPS system according to another embodiment in the present disclosure.

FIG. 2 is a block diagram illustrating an apparatus for controlling operation of a hydraulic ISG system using an EHPS system according to another embodiment in the present disclosure. Referring to FIG. 2, the apparatus for controlling operation of a hydraulic ISG system using an EHPS system includes a working fluid storage 100, an integrated hydraulic pump 200, a steering gearbox 300, an accumulator 400, a solenoid valve 500, an ISG engine starting system 600, a sensor 700, a controller 800, and a T-connector 900.

The working fluid storage 100 is a space in which a working fluid is stored. The integrated hydraulic pump 200 pressurizes the working fluid transferred from the working fluid storage 100. The steering gearbox 300 steers a vehicle using the working fluid pressurized by the integrated hydraulic pump 200.

The accumulator 400 is branched between the integrated hydraulic pump 200 and the steering gearbox 300 and stores the working fluid pressurized by the integrated hydraulic pump 200. The solenoid valve 500 is disposed in front of the accumulator 400 to open or close a communication pipe branched between the integrated hydraulic pump 200 and the steering gearbox 300. The ISG engine starting system 600 starts an engine when the vehicle restarts after idling stop, by using the working fluid stored in the accumulator 400. After the ISG engine starting system 600 operates using the working fluid, the working fluid is stored again in the storage 100.

The sensor 700 measures a pressure of the working fluid stored in the accumulator 400, a steering angle, and a steering angular velocity. The sensor 700 includes a pressure sensor 710 for measuring the pressure of the working fluid stored in the accumulator 400, a steering angle sensor 720 for measuring a steering angle, and a steering angular velocity sensor 730 for measuring a steering angular velocity.

The controller 800 opens or closes the solenoid valve 500 according to the method for controlling operation of a hydraulic ISG system using an EHPS system, based on the information of the sensor 700. The T-connector 900 serves to branch the communication pipe between the integrated hydraulic pump 200 and the steering gearbox 300.

In accordance with the exemplary embodiments in the present disclosure, it is possible to reduce costs and a mounting space, prevent unnecessary energy consumption, and improve fuel efficiency, by using an integrated pump which performs the same function in the EHPS system and the hydraulic ISG system.

While the present disclosure has been described with respect to the specific embodiments, it will be apparent to those skilled in the art that various changes and modifications may be made without departing from the spirit and scope of the invention as defined in the following claims.

What is claimed is:

1. A method for controlling operation of a hydraulic idle stop and go (ISG) system using an electro hydraulic power steering (EHPS) system, comprising:
   measuring, by sensors, a pressure in an accumulator, a steering angle, and a steering angular velocity;
   determining, by a controller, whether the measured pressure in the accumulator is less than an absolute value of a first reference pressure;
   determining, by the controller, whether the measured steering angle is less than an absolute value of a reference angle when the measured pressure in the accumulator is less than the absolute value of the first reference pressure;
   determining, by the controller, whether the measured steering angular velocity is less than an absolute value of a reference angular velocity when the measured steering angle is less than the absolute value of the reference angle; and
   opening, by the controller, a solenoid valve when the measured steering angular velocity is less than the absolute value of the reference angular velocity.

2. The method of claim 1, further comprising determining whether the measured pressure in the accumulator exceeds an absolute value of a second reference pressure after the opening the solenoid valve.

3. The method of claim 2, further comprising closing the solenoid valve when the measured pressure in the accumulator exceeds the absolute value of the second reference pressure.

4. The method of claim 3, further comprising operating the ISG system after the closing the solenoid valve.

5. The method of claim 4, wherein the step of operating the ISG system is performed when the measured pressure in the accumulator is equal to or greater than the absolute value of the first reference pressure.

6. The method of claim 1, wherein the step of measuring the pressure is executed again when the measured steering angle is equal to or greater than the absolute value of the reference angle.

7. The method of claim 1, wherein the step of measuring the pressure is executed again when the measured steering angular velocity is equal to or greater than the absolute value of the reference angular velocity.

8. The method of claim 1, wherein the reference angle is 540°.

9. The method of claim 1, wherein the reference angular velocity is 180°/sec.

10. The method of claim 2, wherein the first reference pressure is equal to the second reference pressure.

11. The method of claim 10, wherein the first reference pressure and the second reference pressure are 10 MPa.

* * * * *